(12) United States Patent
Kretz et al.

(10) Patent No.: US 12,012,131 B2
(45) Date of Patent: Jun. 18, 2024

(54) TRACTIVE VEHICLE AND VEHICLE COMBINATION AND METHOD FOR OPERATING A TRACTIVE VEHICLE AND VEHICLE COMBINATION

(71) Applicant: Bombardier Transportation GmbH, Berlin (DE)

(72) Inventors: Michael Kretz, Staufen (CH); Christoph Oertli, Basel (CH); Manuel Ayala, Zurich (CH); Peter Brugger, Bonstetten (CH); Peter Christener, Schofflisdorf (CH); Rüdiger Kögel, Karlsdorf-Neuthard (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 17/255,510

(22) PCT Filed: Jun. 5, 2019

(86) PCT No.: PCT/EP2019/064660
§ 371 (c)(1),
(2) Date: Dec. 23, 2020

(87) PCT Pub. No.: WO2020/001947
PCT Pub. Date: Jan. 2, 2020

(65) Prior Publication Data
US 2021/0269070 A1  Sep. 2, 2021

(30) Foreign Application Priority Data
Jun. 28, 2018  (DE) ..................... 10 2018 115 613.8

(51) Int. Cl.
*B61H 9/04* (2006.01)
*B60L 15/20* (2006.01)
(Continued)

(52) U.S. Cl.
CPC ............ *B61H 9/04* (2013.01); *B60L 15/2018* (2013.01); *B61H 9/006* (2013.01); *B61H 11/005* (2013.01); *B61H 11/14* (2013.01); *B60T 2201/06* (2013.01)

(58) Field of Classification Search
CPC .......... B60T 7/20; B60T 7/122; B60T 8/1705; B60T 13/665; B60T 17/228; F16H 61/20;
(Continued)

(56) References Cited

U.S. PATENT DOCUMENTS 5,549,365 A  8/1996 Vernier et al.
8,380,417 B2  2/2013 Kaster
(Continued)

FOREIGN PATENT DOCUMENTS

CN  101119880 A  2/2008
CN  101535114 A  9/2009
(Continued)

OTHER PUBLICATIONS

English machined translation of DE—102014219121, description only, (Mar. 24, 2016).*
(Continued)

*Primary Examiner* — Robert A. Siconolfi
*Assistant Examiner* — San M Aung
(74) *Attorney, Agent, or Firm* — The Webb Law Firm (57) ABSTRACT

A method for operating a tractive vehicle and a vehicle combination are disclosed. A tractive vehicle includes a first friction brake device for generating a first stopping braking-force, a traction device for generating a tractive force and a control device for controlling at least the traction device. The method includes a step whereby the traction device activated if a first undesired kinematic state is detected. Activation of the traction device would take place in such a way that a tractive force, counteracting the first undesired
(Continued)

kinematic state, is generated and provided for deceleration to a standstill and/or for holding the tractive vehicle at a standstill.

15 Claims, 3 Drawing Sheets

(51) Int. Cl.
 *B61H 9/00* (2006.01)
 *B61H 11/00* (2006.01)
 *B61H 11/14* (2006.01)
(58) Field of Classification Search
 CPC ........... F16H 61/0059; F16H 2059/443; F16H 2061/205
 USPC ........................................................ 188/124
 See application file for complete search history.

(56) References Cited

U.S. PATENT DOCUMENTS

| | | | | |
|---|---|---|---|---|
| 8,406,952 | B2* | 3/2013 | Nakayama | .............. B60T 7/122 |
| | | | | 180/170 |
| 9,037,323 | B2 | 5/2015 | Kumar et al. | |
| 9,145,145 | B2 | 9/2015 | Kumar et al. | |
| 10,576,956 | B2 | 3/2020 | Baehrle-Miller et al. | |
| 2003/0214185 | A1* | 11/2003 | Kinder | .................. B60T 11/103 |
| | | | | 188/DIG. 2 |
| 2005/0140144 | A1 | 6/2005 | Kumar | |
| 2007/0001629 | A1* | 1/2007 | McGarry | .................. B60L 3/10 |
| | | | | 318/52 |
| 2010/0194186 | A1* | 8/2010 | Smith | ................... B60T 13/665 |
| | | | | 303/9.63 |
| 2014/0020765 | A1 | 1/2014 | Oren | |
| 2016/0176419 | A1 | 6/2016 | Tsuzaka | |
| 2016/0244073 | A1* | 8/2016 | Foerster | .............. B60L 15/2081 |
| 2016/0332606 | A1 | 11/2016 | Buchner et al. | |
| 2017/0334414 | A1* | 11/2017 | Kumar | .................... B60T 8/175 |

FOREIGN PATENT DOCUMENTS

| | | | | |
|---|---|---|---|---|
| CN | 102029992 A | 4/2011 | | |
| CN | 103415425 A | 11/2013 | | |
| CN | 105517866 A | 4/2016 | | |
| CN | 107914689 A | 4/2018 | | |
| DE | 102009005624 A1 | 8/2010 | | |
| DE | 102009005624 A1 * | 8/2010 | ............. F16H 61/20 | |
| DE | 102009025553 A1 | 12/2010 | | |
| DE | 102013219743 A1 | 4/2015 | | |
| DE | 102014219121 * | 3/2016 | | |
| DE | 102014219121 A1 | 3/2016 | | |
| DE | 102014219121 A1 * | 3/2016 | ............ B60T 13/665 | |
| EP | 0687609 A1 | 12/1995 | | |
| WO | 2008009443 A1 | 1/2008 | | |

OTHER PUBLICATIONS

English machined translation of DE-102009005624, Aug. 5, 2010.*
Wikipedia, "Elektrodynamische Bremse", https://de.wikibooks.org/wiki/Eisenbahntechnik:_Zugtypen#Bremsen, Feb. 5, 2021, English-language translation.

* cited by examiner

TRACTIVE VEHICLE AND VEHICLE COMBINATION AND METHOD FOR OPERATING A TRACTIVE VEHICLE AND VEHICLE COMBINATION

CROSS-REFERENCE TO RELATED APPLICATIONS

This application is the United States national phase of International Application No. PCT/EP2019/064660 filed Jun. 5, 2019, and claims priority to German Patent Application No. 10 2018 115 613.8 filed Jun. 28, 2018, the disclosures of which are hereby incorporated by reference in their entirety.

BACKGROUND OF THE INVENTION

Field of the Invention

The present invention relates to a method for operating a traction vehicle and a multi unit vehicle, in particular embodied as a rail vehicle. Furthermore, the invention relates to such a traction vehicle and such a multi unit vehicle.

Description of Related Art

Multi unit vehicles are generally known, for example, a track-based multiple unit vehicle system or a truck multiple unit vehicle system. For example, in the case of the former, a locomotive is coupled together with a number of non-powered railcars, which are mutually guided on rails and represent a track-based multi unit vehicle. In multi-truck combinations, the multi unit vehicle is formed from a towing machine and a number of trailers, by which means, for example, large amounts of raw materials may be transported (road train).

Furthermore, the most varied of methods are extensively used to operate traction vehicles or multi unit vehicles. As an example of such a method, it may be mentioned that traction vehicles and multi unit vehicles are sometimes equipped with automatic speed control methods (cruise control) or with automated methods for precise braking.

DE 2009 025 553 A1 shows an operating device for a locomotive, wherein a force-related operating mode and a speed-related operating mode are mentioned. The locomotive may thereby be controlled in a customized way by means of a specific adjustment of an operating lever.

The previously known solutions are, however, either very complexly designed and/or do not permit efficient and flexible usage.

SUMMARY OF THE INVENTION

One object of the present invention is therefore to provide a method for operating a traction vehicle and/or a multi unit vehicle, by which means the disadvantages of the prior art are avoided, and in particular a high flexibility of the traction vehicle and/or of the multi unit vehicle is enabled.

The above problem is solved by a method for operating a traction vehicle, as described herein.

According to one embodiment, such a traction vehicle has a first friction braking device for generating a first holding braking force, a traction device for generating a traction force, and a control device for controlling at least the traction device. Optionally, the control device may be configured to also control the first friction braking device.

For example, the first friction braking device acts on a first wheel with respect to a running surface, such that when a first friction brake is activated, a first holding braking force acts between the running surface and the traction vehicle, or the first holding braking force acts in a braking or holding way on the traction vehicle.

The traction vehicle may have at least one traction wheel driven by the traction device and/or the first friction braking device may act on the first wheel. The traction wheel supports a traction torque of the traction wheel with respect to the running surface and thus effects the traction force acting on the traction vehicle. The first wheel analogously generates the first holding braking force.

Such a traction vehicle, including a traction vehicle according to one or more of the subsequently described embodiments of the traction vehicle, is thereby configured to execute the method according to claim 1 and/or embodiments of this method. For example, friction braking devices, traction devices, and/or control devices are configured such that the individual steps of the method or embodiments thereof may be represented in a targeted way. For reasons of readability and comprehension, the method according to the invention and embodiments thereof are discussed in connection to the description of the embodiments of the traction vehicle.

According to a non-limiting embodiment, the traction vehicle has an adhesion device. This is configured and provided such that a tribological system may be manipulated between the traction wheel and the assigned running surface and/or between the first wheel and the assigned running surface. In particular, a coefficient of friction between the traction wheel and/or the first wheel and the running surface may be increased using the adhesion device.

For example, the adhesion device is embodied as a sanding device. A sanding device may introduce sand between a wheel and a running surface when activated. In the case of a rail vehicle, sand is thereby blown between the wheel rims and the rails, wherein the sand is at least partially crushed and the adhesive and sliding friction of the wheel rim-rail tribological system increases.

The first friction braking device may thereby be embodied, in particular for a rail vehicle, as pad brakes or disk brakes. It is also conceivable to embody the friction braking device as a magnetic, drum, band, and/or shoe brake.

According to one specific configuration, a braking cylinder pressure of the friction brake applies a maximum of 350 kPa, preferably a maximum of 420 kPa. According to another or alternative embodiment, a first holding braking force generates a maximum of 120 kN, preferably a maximum of 136 kN.

When using a disk brake, the braking force acts between a brake lining and a brake disk. In particular, it is assumed in the context of this invention, that the tribological system between the wheel and running surface is superior to the tribological system of the actual friction brake, in particular between the friction lining or brake pad and brake disk or brake surface, with respect to adhesive and sliding friction. Consequently, a tractive and/or pushing force acting on the traction vehicle and exceeding the braking force, always leads to slippage of the friction brake. The rolling contact between the wheel and running surface is retained and does not transition into a sliding contact.

According to another, non-limiting embodiment of the traction vehicle, the first friction braking device is configured such that increased holding braking force may be generated, wherein the increased holding braking force is greater than the first holding braking force provided in normal operation.

This may be achieved, for example, in that the components of the first friction brake are configured such that they also apply an increased braking pressure of 650 kPa, preferably 770 kPa, maximally preferably 830 kPa. In particular, this results in an increased holding force of a maximum of 210 kN, preferably 235 kN, maximally preferably 254 kN.

Alternatively or in addition to the above embodiment, the traction vehicle may have a second friction braking device, which may generate a second holding braking force on the traction vehicle. Such a second friction braking device may be configured similarly or identically to the first friction braking device, act on a second wheel or also on the first wheel of the traction vehicle, and, in particular, generate identical or similar values of braking forces (see above).

Furthermore, a possible configuration of the first friction braking device also applies in particular to a possible configuration of the second friction braking device.

The second friction braking device has the effect that a second holding braking force may be provided, in addition to the first holding braking force, in order to act on the traction vehicle, in particular to brake the traction vehicle or to maintain a standstill. In summary, the first holding braking force and the second holding braking force may represent values according to the increased holding braking force described above.

According to another embodiment, in particular depending on the specific configuration of the friction braking device, a friction braking device of the traction vehicle is configured such that a coefficient of adhesion of the traction vehicle at a standstill is at least 16.5%, in particular at least 18.5%, preferably at least 20%, and particularly preferably at least 22%. The coefficient of adhesion $\tau$ is the quotient of the maximally effective braking force or holding braking force $H_{total}$, generatable by the friction braking device(s) of the traction vehicle, and the product of the total mass of the traction vehicle $m_{traction\ vehicle}$ and the gravitational constant g. In particular, braking forces, which are provided by alternative braking devices, for example by electric brakes, eddy-current brakes, magnetic brakes, brakes of other vehicles coupled to the traction vehicle, may not be counted toward the maximum generatable braking force, or holding braking force $H_{total}$.

$$\tau = H(total)/m(traction\ vehicle) \cdot g$$

According to one embodiment of the method according to the invention, the method for operating the traction vehicle or embodiments thereof has at least the following steps:

The first friction braking device is actuated such that the first holding braking force is applied. In particular, the holding braking force acts in a braking way on a moving traction vehicle and/or in a holding way on a traction vehicle at a standstill. The standstill of the traction vehicle is thereby to be maintained.

In particular, such a targeted operating state of the traction vehicle at a standstill is to be designated as a holding operation mode. This is characterized in that the traction vehicle should be at a standstill and that this standstill is only assumed temporarily. It is conceivable that—in the case of a rail vehicle—such a targeted holding operation mode is then to be assumed when the rail vehicle must temporarily wait at a stop signal.

In addition, a kinematic state of the traction vehicle is monitored such that a first undesired kinematic state may be detected.

In particular, a kinematic state of the traction vehicle is, for example, a movement, speed, and/or acceleration of the traction vehicle, wherein the kinematic state may be determined in particular by way of a distance traveled, a speed, a geographic location change, an acceleration, and/or a duration of the same. Additionally or alternatively, a kinematic state may also be determined if, at present force ratios, an imminent movement, speed, and/or acceleration of the traction vehicle may be concluded.

In particular, a kinematic state of the traction vehicle is depicted as undesired if this is not provided at the corresponding torque. For example, a kinematic state of a traction vehicle is then undesired if said vehicle is to wait at a standstill at a red light signal, traffic light, or signal; however, contrary to this intention, still carries out a movement, assumes a speed, an acceleration is present, and/or if one such is imminent, and/or is signaled by third indicators, for example, forces.

The method according to the invention furthermore includes the step that the traction device is activated if the first undesired kinematic state is detected. An activation of the traction device would be effected such that a traction force, counteracting the first undesired kinematic state, is generated and provided for braking to a standstill and/or for holding the traction vehicle at a standstill.

As relates to the invention, the expression "traction force" is understood that this may be a force which may be established at a stationary drive. Simultaneously, in the meaning of the present patent application, "braking force" is also to be understood under "traction force". Braking force is, in connection with a drive, a force, which is established counter to a torque acting externally on the drive.

If the first undesired kinematic state is, for example, an undesired movement of the traction vehicle, then the traction force generated is configured such that this counteracts the undesired movement, correspondingly decelerates the traction vehicle and transitions it to a standstill.

In particular, the traction device thereby introduces a drive torque into the traction wheel such that this in turn generates a traction force acting on the traction vehicle via the wheel-running surface contact.

When using the method according to the invention, the initially result is that a desired standstill of the traction vehicle is maintained, even if the friction braking device, in particular the first friction braking device, does not have sufficient potential to hold the traction vehicle at a standstill. In particular, the vehicle is also held at a standstill if the maximum applicable holding braking force is less than a pushing or tractive force acting on the traction vehicle. In such a case, the traction device compensates for the deficit of the present first friction brake and/or a first holding braking force with respect to the undesired active pushing or tractive force by providing the counteracting traction force.

The advantageous mode of action of the method according to the invention shall be subsequently explained using the example of a track-bound traction vehicle, a locomotive: if such a traction vehicle arrives at a stop signal at an ascending track, then the traction vehicle is braked prior to the stop signal by actuating the first friction braking device and/or another braking device and is brought to a standstill. The traction vehicle is thus transitioned into a holding operation mode, wherein the standstill is initially to be guaranteed only by the first holding braking force. In the case of a standstill without an undesired kinematic state, the acting first holding braking force equals a downhill force of the traction vehicle caused by gravity.

However, if the slope of the running surface is high enough that the downhill force exceeds a maximum value of the first holding braking force, other tractive and pushing forces on the traction vehicle also possibly add to the existing downhill force, then the first friction brake slips and the traction vehicle moves in the downhill direction. Consequently the traction vehicle moves over an undesired track section, records an undesired speed, in particular due to undesired acceleration. Thus, the traction vehicle assumes a first undesired kinematic state.

This first undesired kinematic state is detected by the control unit of the traction vehicle, if necessary, by means of suitable sensors. This triggers an actuation of the traction device. The traction device thereby establishes a traction torque and a traction force resulting therefrom, which acts counter to the downhill force, and optionally other forces, and behaves additively to the first holding braking force with respect to the mode of action and/or direction of action. The level of the traction force is thereby selected such that the traction vehicle arrives at a standstill and maintains this within a predefined track section, predefined time, and/or purely as quickly as possible.

Such a method achieves the advantage that the first friction braking device may have reduced dimensions. This arises because conventional braking and/or holding situations of the traction vehicle, for example on a flat track or a moderate slope, may be mastered solely by the first friction braking device. Less common braking and/or holding situations with increased braking and/or holding force requirements are safely managed by means of the interaction of the first friction braking device and the traction device. The dimensional requirements of the friction braking device, which are thus potentially reduced, lead in turn to reduced costs for the traction vehicle.

In particular, it is disclosed in the context of the invention to use the method and/or the embodiments thereof in the context of rail vehicles. Thus, the invention optionally also relates to a method for using a speed control system of a traction device for controlling and maintaining the speed at a standstill, in particular if a temporary holding function is to be described during the holding operation mode of the traction vehicle Thus, a method is disclosed for operating a traction vehicle during a holding operation mode.

According to one refinement of the method during the operation of the traction vehicle in the holding operation mode, a maximum value for torque, power and/or speed of the traction vehicle is determined, wherein the maximum value is less than a maximum torque, maximum power, and/or maximum speed of the traction device. In particular, the maximum value is less than 10%, preferably less than 8%, particularly preferably less than 6% of the maximum torque, maximum power, and/or maximum speed. The maximum value may thereby correspond to a certain speed stage, for example, the first speed stage of a speed controller of the traction vehicle. The control of the traction device for achieving and ensuring the standstill of the traction vehicle thus takes place within a certain torque, power, and/or speed range of the traction device. By this means, a component and energy saving use of the method is enabled.

According to another embodiment of the method, the traction vehicle has either the first friction braking device, configured to provide the increased holding braking force with respect to the first holding braking force, and/or the second friction braking device for providing the supplementary second holding braking force. The second holding braking force thereby acts additively to the first holding braking force.

Furthermore, the kinematic state of the traction vehicle is monitored, such that a second undesired kinematic state may be detected. In such a case, the second holding braking force and/or—depending on the configuration of the traction vehicle—the increased holding braking force, is provided in addition to the first holding braking force.

Analogous to the first undesired kinematic state, the second kinematic state is determined by distance, speed, geographic location, acceleration, duration of the same, and/or indicators thereof. Such an indicator may also be, for example, that an energy supply for the traction device may not be guaranteed, and thus a provision of the counteracting traction force is not possible.

The second undesired kinematic state is, in particular, larger than the first undesired kinematic state with respect to an absolute amount. Additional specifications regarding this are found in the subsequent description of a method for operating a multi unit vehicle, in particular in the discussion of the embodiment using different measured values and thresholds.

The advantage arises in the use of the method according to the invention according to the above embodiment with an increased or second holding braking force, that a redundant system is provided. If, for example, the traction force generated in addition to the first holding braking force is not sufficient in order to compensate for the pushing and tractive forces acting on the traction vehicle, then the traction vehicle would continue to be in an undesired kinematic state. If a second undesired kinematic state is now achieved, this triggers the activation of the second friction braking device and/or the provision of the increased holding braking force such that the traction vehicle is transitioned into a standstill and may be held there.

According to another embodiment of the method, the sanding device is activated. This occurs, in particular, in at least direct temporal proximity to the activation of the traction device. In particular, the traction device may be already activated earlier.

According to one advantageous embodiment, the sanding device is only activated if indications are present, that an adhesion contact may not be ensured between a braking wheel or traction wheel and a running surface, thus that a sliding between wheel and running surface is to be expected. The surroundings temperature, atmospheric humidity, the geographic location, and/or a state of the running surface or of a running surface of a wheel may thereby be taken into consideration.

In the context of the invention, a multi unit vehicle is disclosed with at least one traction vehicle according to one, multiple, or combinations thereof of the preceding embodiments, and at least one supplementary vehicle coupled to the traction vehicle. The supplementary vehicle, for example in the case of rail vehicles, embodied as a railcar, is, in particular, not driven, and has a supplementary braking device for generating a supplementary braking force.

According to another configuration, the multi unit vehicle may be formed from multiple traction vehicles and multiple supplementary vehicles. Such a multi unit vehicle is designated in the area of rail transport as a trainset, wherein traction vehicles and non-driven supplementary vehicles are combined in certain configurations. Such traction vehicles are, for example, the ICE of the German railway or the TGV of the French railway. Freight trains with multiple pulling (double traction), pushing, and/or pushing and pulling locomotives may also be understood as trainsets.

The multi unit vehicle or configurations thereof are configured and embodied such that a subsequently described method may be executed for operating one or more embodiments thereof or combinations thereof.

According to one embodiment of the method, a first friction braking device of the traction vehicle is activated to provide a first holding braking force. This functions, in particular, to brake the multi unit vehicle to a standstill and/or to hold the multi unit vehicle at a standstill. In this case, the multi unit vehicle is in holding operation mode.

In addition, a kinematic state is monitored for the multi unit vehicle, the traction vehicle, and/or the supplementary vehicles. If a first undesired kinematic state occurs, then the traction device of the traction vehicle is activated such that a counteracting traction force is provided for braking and holding the multi unit vehicle at a standstill. In particular, the traction force thereby counteracts a movement connected to the undesired kinematic state, or an expected movement such that the multi unit vehicle—in case this has already moved in an undesired way—is braked to a standstill again, or such that the multi unit vehicle—in case an undesired movement is indicated—is held at a standstill.

The above embodiments of the method for operating a traction vehicle—or parts thereof—are to be understood analogously in the context of operating a multi unit vehicle. Consequently, statements made about that likewise apply, provided that they are not opposed in content, to the method for operating the multi unit vehicle and for embodiments thereof.

The method for operating the multi unit vehicle initially requires that the multi unit vehicle is held at a standstill in the holding operation mode exclusively by braking devices, in particular, friction braking devices of the traction vehicle and, as needed, by the traction device, or that such a standstill is assumed again as quickly as possible. An activation of the supplementary brake of the supplementary vehicle is thus not necessary. The advantage arises from this, in particular for a multi unit vehicle, that it may switch especially quickly from holding operation mode into a driving mode, and thus an energy expenditure connected to this may be reduced.

The activation, however, in particular, the deactivation, of the supplementary braking device of the supplementary vehicle typically requires a substantial time period and energy expenditure. As the activation of the supplementary braking devices of supplementary vehicles may initially be completely avoided in the holding operation mode, a faster and more energy saving switch from holding operation mode to driving mode may be effected.

This advantage appears particularly clearly in multiple unit vehicle systems with one or more locomotives and a high number of railcars. In this case, the supplementary braking devices of the railcars are operated using an interconnected compressed air system, which forms a high total volume. Traditionally, the entire compressed air system had to be applied with the operating pressure in driving mode, due to which a substantial delay arose in the operating sequence, which is now avoided. For example, a filling time of the braking system in traditional 10,000 ton multiple unit vehicle systems amounts to up to 20 minutes.

According to one embodiment of the method, during the operation of the multi unit vehicle in the holding operation mode, that is, during a desired and temporary standstill, exclusively the friction braking device, and, if necessary, the traction device of the traction vehicle is/are actuated as needed in order to thus guarantee the holding operation mode.

In particular, the supplementary braking device of the supplementary vehicle is not active during the holding operation mode. The standstill of the supplementary vehicle is thus guaranteed only by the mechanical coupling to the traction vehicle and its braking devices.

Furthermore, the contents of the following embodiments of the method for operating a multi unit vehicle—or parts thereof—also relate analogously to embodiments for operating a traction vehicle according to the above description. Conflicting combinations are excluded.

According to one embodiment of the method for operating a traction vehicle and/or a multi unit vehicle, the kinematic state of the traction vehicle and/or of the multi unit vehicle is determined by way of at least one first measured value.

Such a measured value may be, for example, a distance traveled, a recorded speed, a geographic location change, an acting acceleration, a duration of the same, and/or an indicator, for example, measured forces or a force ratio for this. This also applies for other, subsequently listed measured values.

A presence of the first undesired kinematic state is thereby determined in that the first measured value exceeds a first threshold associated with the first undesired kinematic state. If the first measured value is, for example, a distance traveled, then the first threshold is a certain value of this distance traveled. If, during the holding operation mode, the traction vehicle and/or the multi unit vehicle travels a distance in an undesired way, which is greater than the threshold of the distance, then the controller detects an undesired kinematic state and activates the traction device in order to provide a corresponding counteracting traction force.

According to one embodiment, the threshold for a traveled distance is not more than 1.5 m, preferably not more than 1.2 m, particularly preferably not more than 1 m.

According to one specific configuration of the method, the controller is configured such that the traction vehicle and/or the multi unit vehicle is brought back into a starting situation or is held in the present situation. The provision of the traction force and a corresponding control is thus effected until the traction vehicle or the multi unit vehicle is back in the starting situation or is held in the present situation and/or is in the starting situation of the original holding operation mode.

If the first measured value and the first threshold are a distance, according to the above example, then the specific embodiment of the method causes the traction vehicle and/or the multi unit vehicle to be moved back to the original location. The controller would remain active there in order to guarantee a standstill.

According to another configuration, the controller is configured such that the traction device remains active after detecting the undesired kinematic state until the holding operation mode of the traction vehicle and/or the multi unit vehicle is ended and the traction vehicle and/or the multi unit vehicle is transitioned into another operating state, for example, into a driving state or a permanent stop mode.

Furthermore, an embodiment is disclosed wherein a monitoring of a second measured value is provided in order to be able to determine the kinematic state of the traction vehicle. The second measured value may thereby be selected as identical to the first measured value with respect to physical or material aspect.

Furthermore, a second threshold is defined for the second measured value, wherein exceeding the second threshold by the second measured value leads to a detection of the second undesired kinematic state. According to the above embodiments of the method for operating a traction vehicle, the detection of the second undesired kinematic state actuates measures for providing the increased holding braking force and/or the activation of the second friction braking device to provide the second holding braking force.

In particular, the second measured value may be an elapsed time, wherein the second threshold represents a certain time interval. For example, the second measured value may be measured, starting from an initial activation of the traction device for holding the traction vehicle/multi unit vehicle at a standstill, wherein an expiration of a certain time interval leads to the activation of the second friction braking device or the provision of the increased holding braking force. In particular, such an activation may be carried out automatically.

Such a configuration of the method has the advantage that additional measures may be implemented during a longer duration of the holding operation mode in order to protect the traction device from overloading, for example, or to save energy.

According to another embodiment of the method for operating a multi unit vehicle, the supplementary braking device of the supplementary vehicle is then activated if a third undesirable kinematic state is detected, in particular if a third measured value exceeds a third threshold, in particular for a specific time period. The third threshold may thereby be at least 8 m, preferably 10 m, particularly preferably 12 m. This means that the supplementary braking device is activated if the multi unit vehicle has moved in an undesired way according to the third threshold. The above embodiment of the method, wherein the supplementary braking device is not immediately activated, is suspended. This does not, however, indicate a contradiction, but instead represents a safety redundancy according to sequential steps. A concurrence of the two embodiments is thus excluded.

According to an optional embodiment, the supplementary braking device may also be triggered if the traction device is active for longer than a specific time period, preferably at least 30 minutes, particularly preferably at least 40 minutes.

The preceding embodiment results in that safety is increased during operation of the multi unit vehicle by providing redundancies. If, for example, braking to a standstill or holding at a standstill by at least one of the previously mentioned measures of the method is not possible, and/or a specific time period expires, then the multi unit vehicle is transitioned from holding operation mode into a permanent stop mode, in that now at least the first friction braking device of the traction vehicle and also the supplementary braking device of the supplementary vehicle are activated.

According to one specific configuration of the method for operating a traction vehicle and/or a multi unit vehicle, the traction vehicle and/or the multi unit vehicle are transitioned by braking to a standstill, in particular from driving operation into holding operation mode. As a consequence, it is automatically or manually specified whether the traction vehicle and/or the multi unit vehicle is located on a descending or ascending underground or on a descending or [ascending] running surface, or whether a downhill force acting on the traction vehicle and/or on the multi unit vehicle acts additively in the direction of travel or counter to the direction of travel. Correspondingly, the control device is preset, in particular automatically, such that the traction device provides the counteracting traction force in the direction (activation direction) of the respective rise. Furthermore, the method is executed according to one of the preceding claims, wherein conflicting combinations are excluded.

According to another embodiment, the method or embodiments thereof are used in order to facilitate a start up function on an ascending track section. The holding operation mode is thereby used to transition out of the permanent stop mode into a driving mode.

In particular, a multi unit vehicle may be held at a standstill in this way, wherein a start up is prepared by releasing the supplementary braking device in the supplementary vehicles.

BRIEF DESCRIPTION OF THE FIGURES

The appended drawings illustrate embodiments of the invention and function together with the description to explain the principles of the invention. The elements of the drawings are relative to each other and not necessarily to scale.

Identical references numerals correspondingly relate to similar parts.

DESCRIPTION OF THE INVENTION

Figure 1:
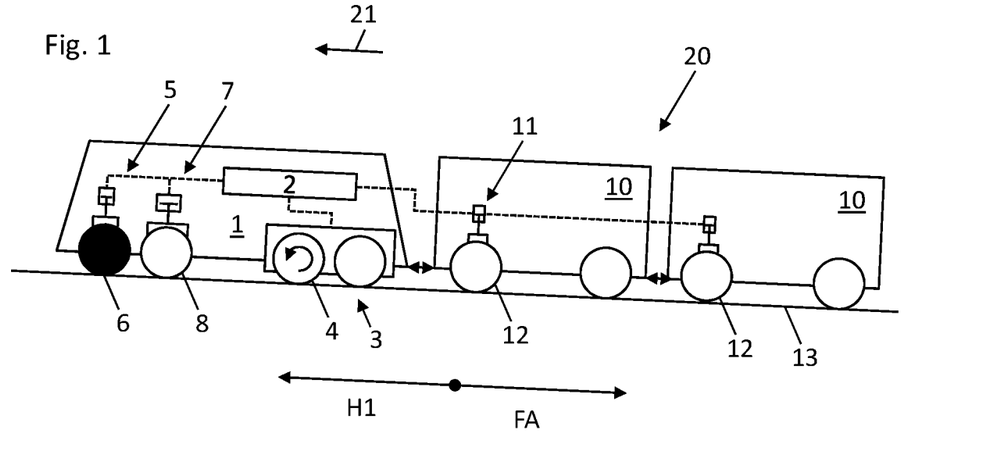
FIG. 1 shows an exemplary multi unit vehicle during the holding operation mode on an ascending underground in a first operating state.

FIG. 1 shows an exemplary multi unit vehicle 20, which is composed of a traction vehicle 1 and two supplementary vehicles 10 coupled thereto. Multi unit vehicle 20 is thereby located in holding operation mode on a running surface 13 ascending with respect to the direction of travel. The holding operation mode stipulates that the multi unit vehicle is only to be at a standstill for a relatively short time period, and a transition into a driving mode by starting up is to take place relatively quickly. The holding operation mode is thus always temporary in nature. For example, the multi unit vehicle according to FIG. 1 is in holding operation mode at a red stop signal.

The following statements regarding FIG. 1 relate to traction vehicle 20 from FIG. 2 to FIG. 5 regarding structural components.

Traction vehicle 1 is thereby supported to be drivable on running surface 13, for example, embodied as a rail, by means of a first wheel 6, a second wheel 8, a traction wheel 4, and another wheel—or by means of corresponding wheel pairs. The aforementioned devices may also mutually act on one or more wheels.

A first friction braking device 5 of traction vehicle 1 is thereby arranged such that this may act on first wheel 6, and subsequently a first holding braking force H1 may be provided. Furthermore, traction vehicle 1 comprises a second friction braking device 7, which may act of a second wheel 8 in order to be able to generate a second holding braking force H2.

In addition, traction vehicle 1 is equipped with a traction device 3, by which means a traction torque may be introduced into traction wheel 4. In this way, traction device 3 may generate a traction force T acting on traction device 1, depending on activation direction 21. It is also conceivable that other wheels are driven by traction device 3.

Supplementary vehicles 10, embodied as railcar in the case of rail vehicles, are rollably mounted via wheels 12 on running surface 13 and may be accelerated by means of traction vehicle 1 in the context of multi unit vehicle 20.

Furthermore, supplementary vehicles 10 have a supplementary braking device 11, by which means a supplementary braking force Z may be generated via wheels 12. For example, supplementary vehicles 10 may be equipped without intrinsic drives.

Traction vehicle 1 may thereby have a control device 2, which is connected for transmitting control signals to first friction braking device 5, second friction braking device 7, traction device 3, and supplementary braking device 11.

In FIG. 1, the multi unit vehicle is in a holding operation mode on an ascending running surface 13 First friction braking device 5 is thereby activated, whereby a first holding braking force H1 acts on multi unit vehicle 20 via wheel 6. To illustrate the activation, wheel 6 in FIG. 1 of first friction braking device 5 is colored black.

Figure 6:
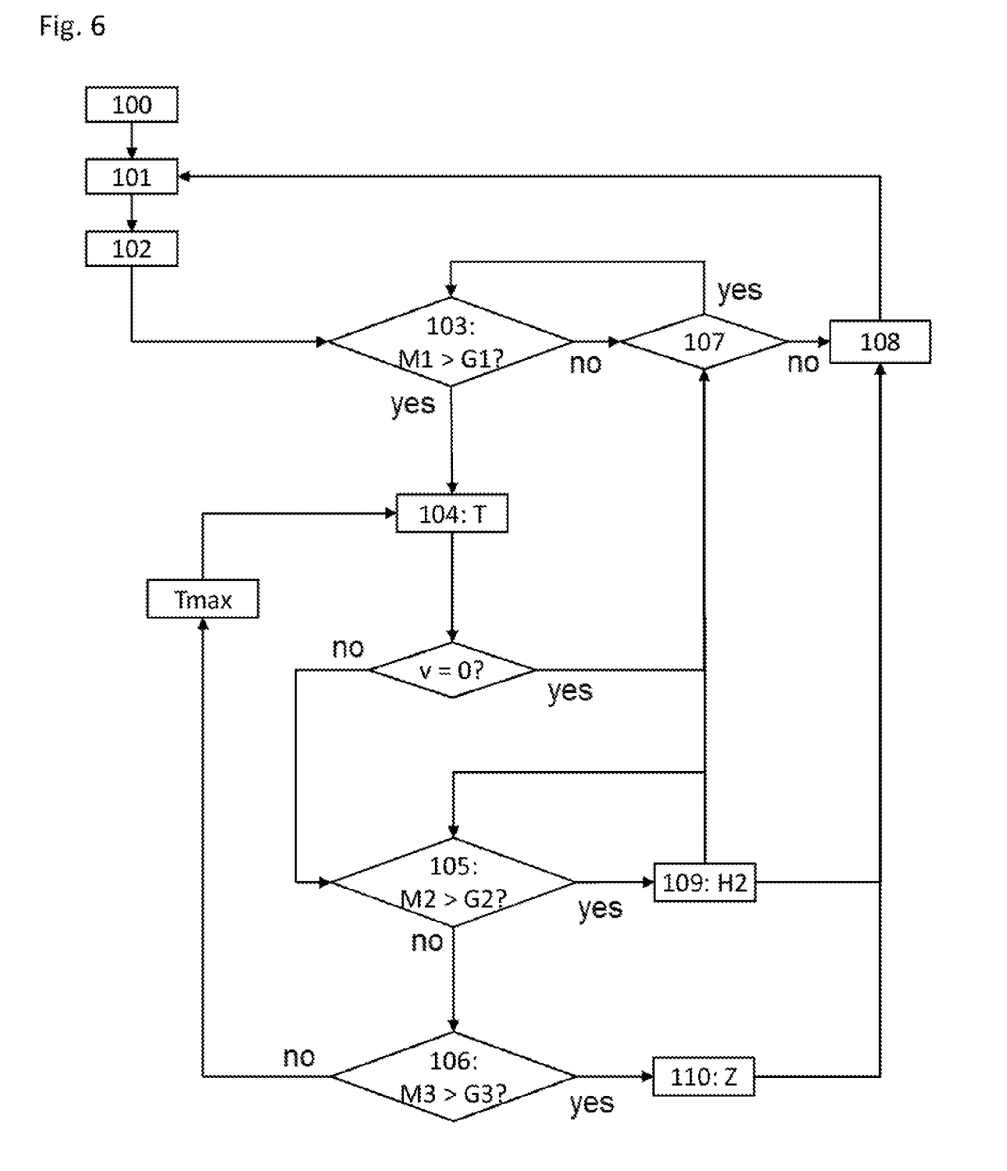
FIG. 6 illustrates a sequence of an operating method or embodiments thereof by means of a flow chart.

Reference is subsequently also made to FIG. 6, wherein individual steps of the method are illustrated.

Multi unit vehicle 20 arrives according to step 100 at a standstill and the holding operation mode is activated according to step 101. This may be the case, for example, in the case of a temporary standstill and also during start up of multi unit vehicle 20.

According to step 102, an activation direction 21 is set, in particular by a driver of multi unit vehicle 20 or automatically. Activation direction 21 in the direction of travel, counter to an additive downhill force FA, causes control device 2 to control traction device 3 such that a traction force T is provided as needed in activation direction 21.

In multi unit vehicle 20 according to FIG. 1, downhill force FA does not exceed the provided first holding braking force H1, and a force equilibrium is established. Consequently, multi unit vehicle 20 is at a standstill, wherein this is maintained. A first measured value M1 consequently does not exceed a first threshold G1, which in turn is assigned to a first undesired kinematic state 103. A provision of a traction torque T is not necessary, as no first undesired kinematic state 103 is detected.

The check for exceeding first threshold G1 is continued until another operating type 108, for example, a permanent stop mode, is selected in step 107.

Figure 2:
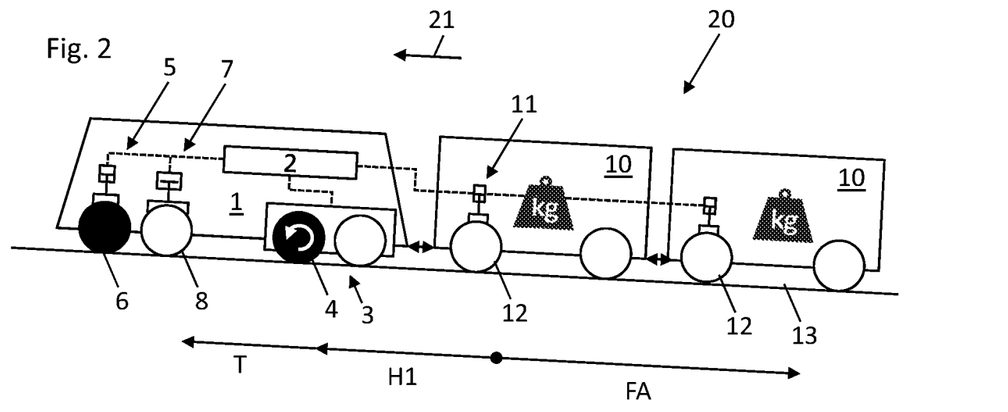
FIG. 2 shows the multi unit vehicle according to FIG. 1 in a second operating state.

In the embodiment according to FIG. 2, supplementary vehicles 10 are heavily loaded such that these produce a high downhill force FA. Additive downhill force FA thereby exceeds an amount according to first holding braking force H1 provided by first holding braking device 5. Consequently, first friction braking device 5 would slip and multi unit vehicle 20 would move counter to activation direction 21, thus backwards, if excessive downhill force FA is not compensated by providing a traction force T and a force equilibrium would be established.

Consequently, first undesired kinematic state 103 is detected, in that first measured value M1 exceeds first threshold G1.

As a result, traction device 3 is activated in step 104 such that a traction force T is provided in the direction of activation direction 21 via traction wheel 4 (black), wherein traction force T does not exceed a maximum value Tmax. Using this traction force T, a control loop is executed in order to control, for example, a speed of multi unit vehicle 20 to zero. This control remains active until another operating type 108 is selected.

Figure 3:
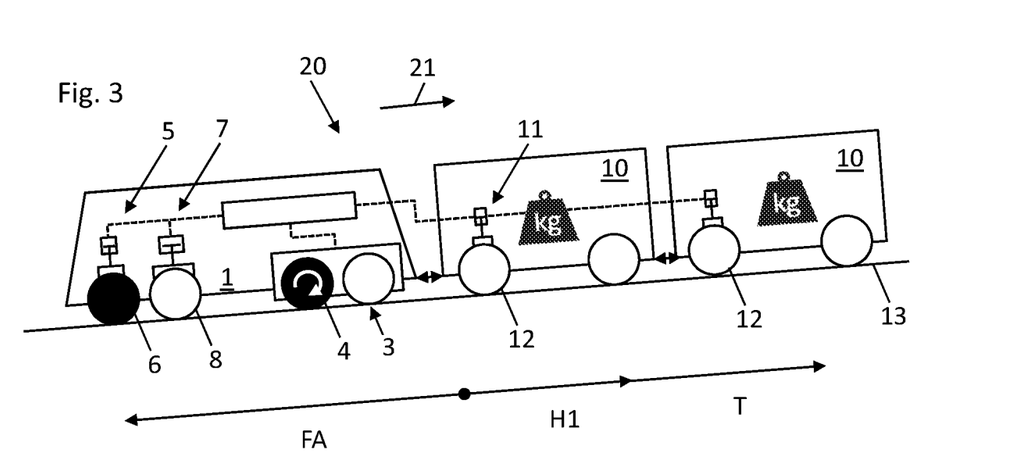
FIG. 3 shows an exemplary multi unit vehicle during the holding operation mode on a descending underground in a third operating state.

This case is depicted by way of FIG. 2 and FIG. 3, wherein traction force T acts in the direction of travel of multi unit vehicle 20 and in the ascending direction of running surface 13 in FIG. 2. In FIG. 3, activation direction 21 is selected counter to the direction of travel and in the ascending direction of running surface 13 such that the provided traction force T is correspondingly provided for holding multi unit vehicle 20 at a standstill.

Furthermore, it may be checked whether a presence of a second undesired kinematic state 105 is present. This is the case if a second measured value M2 exceeds a second threshold G2. This second measured value M2 may be, for example, an elapsed time, in particular how long a traction force T has already been provided, according to step 104, in order to prevent a presence of first undesired kinematic state 103. Second measured value M2 may also be a distance, a speed, an acceleration, and/or indicators thereof.

Figure 4:
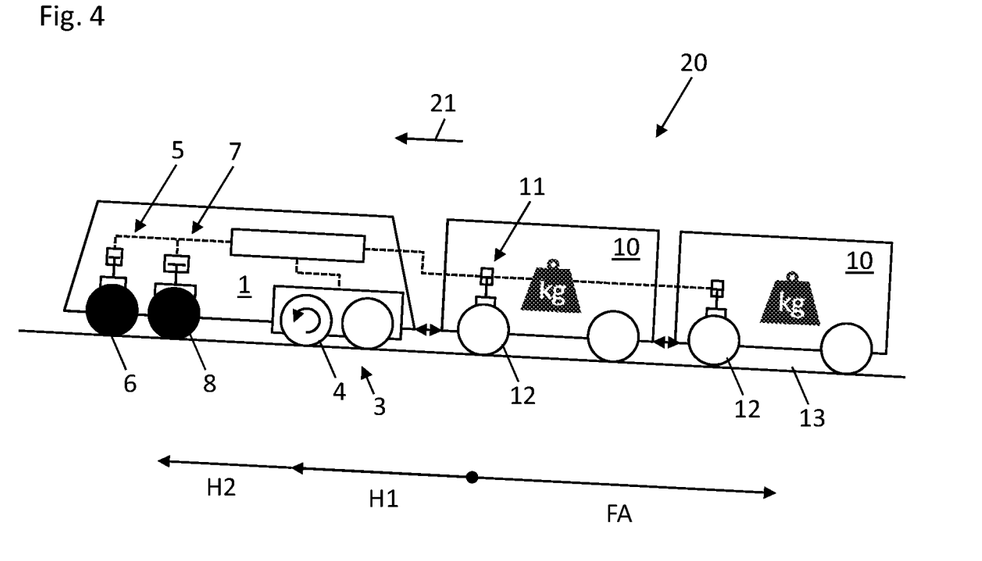
FIG. 4 shows the multi unit vehicle according to FIG. 1 in a fourth operating state.

This case is schematically depicted by way of FIG. 4. Exceeding second threshold G2 leads to second friction braking device 7 acting on second wheel 8 and generating a second holding braking force H2 in step 109. The standstill of multi unit vehicle 20 is thus achieved in that first holding braking force H1 and second holding braking force H2 act in the same direction and additively compensate for increased downhill force FA. Consequently, multi unit vehicle 20 is at a standstill without drive device 3 having to provide a traction force T.

It is also conceivable that both second holding braking force H2 according to FIG. 4 and also traction force T according to FIG. 2 are provided in order to thus interactively hold multi unit vehicle 20 at a standstill.

Furthermore, it is checked in step 106 whether a third measured value M3 exceeds a third threshold G3. If, for example downhill force FA is so large, that first braking force H1 of first friction braking device 5 is not sufficient in order to hold multi unit vehicle 20 at a standstill, and third measured value M3 yields, for example, that drive device 3 is not usable, then supplementary braking device 11 in supplementary vehicles 10 is activated in step 110. Supplementary braking force Z activated thereby, together with first holding braking force H1, equals downhill force FA such that multi unit vehicle 20 is at a standstill.

Figure 5:
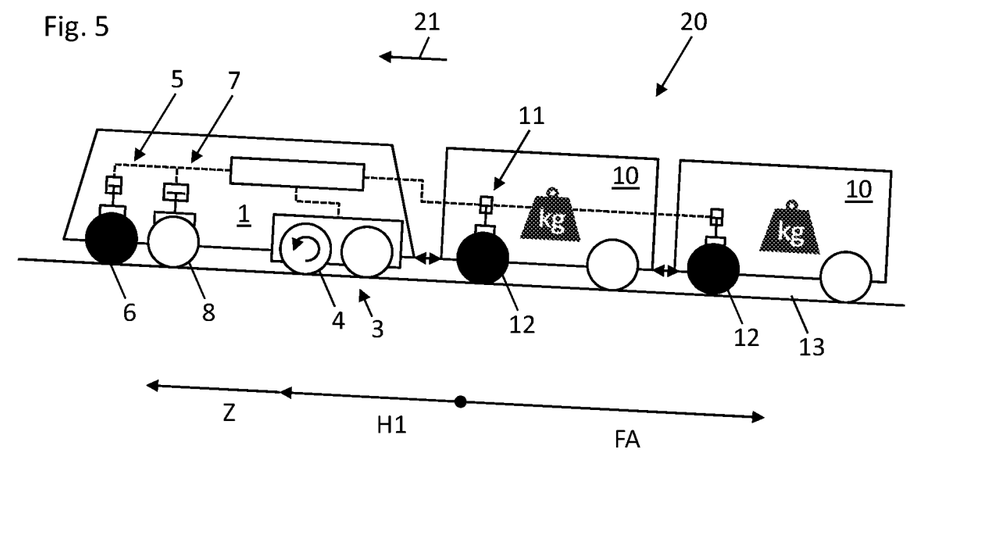
FIG. 5 shows the multi unit vehicle according to FIG. 1 in a permanent stop operation.

This state of multi unit vehicle 20, also shown in FIG. 5, represents an operating state deviating from the holding operation mode, namely the permanent stop mode. Before multi unit vehicle 20 may transition back into a driving mode, all supplementary braking devices 11 must be deactivated.

Even if specific embodiments have depicted and described herein, it remains within the scope of the present invention to suitably modify the embodiments shown without deviating from the scope of protection of the present invention. For example, the different operating states according to FIG. 2 and FIG. 4 may be combined, wherein traction force T interacts with first holding braking force H1 and second holding braking force H2.

Furthermore, it is also conceivable to use the method and/or embodiments thereof for starting up a multi unit vehicle 20 on an ascending running surface 13, for example, on an ascending track section. Traction vehicle 1 and/or multi unit vehicle 20 would thereby initially be in permanent stop mode with activated supplementary brakes 11. In order to transition into driving mode, the holding operation mode would be selected as an intermediate mode, wherein supplementary brakes 11 of supplementary vehicles 10 could already be released in order to facilitate a fast start up.

The invention claimed is:

1. A method for operating a traction vehicle in a holding operation mode, the method comprising:
actuating a first friction braking device of the traction vehicle to generate a first holding braking force and applying the first holding braking force for maintaining a desired standstill of the traction vehicle;
monitoring a kinematic state of the traction vehicle while maintaining application of the first holding braking force for maintaining a desired standstill of the traction vehicle;
if a first undesirable movement is detected, providing an increased holding braking force compared to the first holding braking force for maintaining a desired standstill of the traction vehicle; and
if the increased holding braking force is less than a pushing or tractive force acting on the traction vehicle, actuating a traction device of the traction vehicle to generate a traction force so that a counteracting traction force is provided for at least one of braking and holding the traction vehicle at a standstill.

2. The method according to claim 1,
wherein the first friction braking device is configured to provide an increased holding braking force compared to the first holding braking force, and/or
wherein the traction vehicle has a second friction braking device for providing a second holding braking force, which can be provided in addition to the first holding braking force, and
wherein the first holding braking force and the second holding braking force and/or the increased holding braking force are provided when a second undesired movement is detected.

3. The method according to claim 1, wherein
the traction vehicle comprises an adhesion device for increasing adhesion between a traction wheel of the traction device and a corresponding running surface, and
wherein the adhesion device is activated at least simultaneously with, and in particular earlier than, the actuation of the traction device for braking and holding the traction vehicle at the standstill.

4. The method according to claim 1, wherein the traction device for holding the traction vehicle at the standstill is operated in a holding operation mode, and wherein the traction device is operated with a maximum value for torque, power, and/or speed, wherein the maximum value is less than a maximum torque, maximum power, and/or maximum speed, wherein the maximum value is less than 10% of the maximum torque, maximum power, and/or maximum speed.

5. A traction vehicle comprising at least one friction braking device for generating at least one holding braking force, a traction device for generating a traction force, and a control device, wherein the control device and the traction vehicle are configured to conduct the method according to claim 1.

6. The traction vehicle according to claim 5, wherein the traction device and an at least friction braking device are configured such that a coefficient of adhesion of the traction vehicle at standstill is at least 16.5%.

7. A method for operating a multi unit vehicle comprising at least one traction vehicle according to claim 1 and at least one supplementary vehicle coupled to the traction vehicle, the supplementary vehicle having at least one supplementary braking device for generating a supplementary braking force, the method comprising:
actuating the first friction braking device and applying the first holding braking force;
monitoring a kinematic state of at least one of the traction vehicle and the supplementary vehicle; and
if a first undesired movement is detected, actuating the traction device such that a counteracting traction force is provided for braking and holding the multi unit vehicle at a standstill.

8. The method according to claim 7, wherein the multi unit vehicle for holding the multi unit vehicle at the standstill is operated in a holding operation mode, and wherein exclusively the first friction braking device and traction device of the traction vehicle and/or no actuation of the supplementary braking device of the supplementary vehicle for holding the multi unit vehicle at the standstill is effected.

9. The method according to claim 1, wherein the kinematic state of the traction vehicle and/or the multi unit vehicle is determined at least by means of a first measured value, and wherein the first undesired movement is present and the traction device is actuated if the first measured value exceeds a first threshold.

10. The method according to claim 2, wherein the kinematic state of the traction vehicle and/or the multi unit vehicle is determined at least by a second measured value, and wherein the second undesired movement is present when the second measured value exceeds a second threshold and/or when the actuation of the traction device for braking and holding the multi unit vehicle to the standstill is unsuccessful.

11. The method according to claim 9, wherein the supplementary braking device is actuated in presence of a third undesirable movement if a third measured value exceeds a third threshold.

12. A method for operating a traction vehicle and/or the multi unit vehicle, the method comprising:
braking the vehicle and/or the multi unit vehicle to a standstill,
activating a holding operation mode of the vehicle and/or the multi unit vehicle, while specifying the holding operation mode is performed on an ascending or a descending underground, and
executing the method according to claim 1.

13. A multi unit vehicle comprising at least one traction vehicle, at least one supplementary vehicle coupled to the traction vehicle, and a control device, wherein the supplementary vehicle has at least one supplementary braking device for generating a supplementary braking force, and wherein at least one of the control device, the traction vehicle, and the multi unit vehicle is configured for executing the method according to claim 2.

14. The multi unit vehicle according to claim 13, wherein at least two traction vehicles and at least two auxiliary vehicles are coupled together with the traction vehicles, and wherein the at least two auxiliary vehicles do not have a traction device.

15. A method for operating a traction vehicle in a holding operation mode, the method comprising:
actuating a first friction braking device of a braking device system of the traction vehicle to generate a first holding braking force and applying the first holding braking force for maintaining a desired standstill of the traction vehicle;
monitoring a kinematic state of the traction vehicle while maintaining to apply the first holding braking force for maintaining a desired standstill of the traction vehicle; and if a first undesirable movement is detected; and if the braking device system provides a predefined maximum value of applicable holding braking force, the predefined maximum value of applicable holding braking force being greater than or equal to the first holding braking force and being the maximum value of holding braking force applicable by the braking device system during operation of the traction vehicle in the holding operation mode but being less than a pushing or tractive force acting on the traction vehicle, actuating a traction device of the traction vehicle to generate a traction force so that a counteracting traction force is provided for at least one of braking and holding the traction vehicle at a standstill.

* * * * *

UNITED STATES PATENT AND TRADEMARK OFFICE
CERTIFICATE OF CORRECTION

| | |
|---|---|
| PATENT NO. | : 12,012,131 B2 |
| APPLICATION NO. | : 17/255510 |
| DATED | : June 18, 2024 |
| INVENTOR(S) | : Michael Kretz et al. |

It is certified that error appears in the above-identified patent and that said Letters Patent is hereby corrected as shown below:

On the Title Page

Column 2, item (57), Abstract, Line 7, before "activated" insert -- is --

Signed and Sealed this
Tenth Day of September, 2024

Katherine Kelly Vidal
*Director of the United States Patent and Trademark Office*